United States Patent
Chaudhary et al.

(10) Patent No.: US 11,741,956 B2
(45) Date of Patent: Aug. 29, 2023

(54) METHODS AND APPARATUS FOR INTENT RECOGNITION

(71) Applicant: Walmart Apollo, LLC, Bentonville, AR (US)

(72) Inventors: Simral Chaudhary, Sunnyvale, CA (US); Deepa Mohan, San Jose, CA (US); Haoxuan Chen, Mountain View, CA (US); Lakshmi Manasa Velaga, Dublin, CA (US); Snehasish Mukherjee, Santa Clara, CA (US); John Brian Moss, Carlsbad, CA (US); Jason Charles Benesch, Santee, CA (US); Don Bambico, San Diego, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 118 days.

(21) Appl. No.: 17/187,393

(22) Filed: Feb. 26, 2021

(65) Prior Publication Data
US 2022/0277741 A1  Sep. 1, 2022

(51) Int. Cl.
*G10L 15/22* (2006.01)
*G10L 25/30* (2013.01)
*G10L 15/06* (2013.01)

(52) U.S. Cl.
CPC ........... *G10L 15/22* (2013.01); *G10L 15/063* (2013.01); *G10L 25/30* (2013.01); *G10L 2015/0631* (2013.01); *G10L 2015/223* (2013.01)

(58) Field of Classification Search
CPC ....... G10L 15/22; G10L 15/063; G10L 25/30; G10L 2015/0631; G10L 2015/223
(Continued)

(56) References Cited

U.S. PATENT DOCUMENTS 7,054,847 B2  5/2006  Hartman et al.
10,453,117 B1 *  10/2019  Reavely ................. G06N 5/027
(Continued)

FOREIGN PATENT DOCUMENTS

WO  2020140372 A1  7/2020

OTHER PUBLICATIONS

S. Papalkar, A. Nagmal, S. Karve and S. A. Deshpande, "A Review of Dialogue Intent Identification Methods for Closed Domain Conversational Agents," 2018 Second International Conference on Electronics, Communication and Aerospace Technology (ICECA), Coimbatore, India, 2018, pp. 566-570, doi: 10.1109/IC (Year: 2018).*

(Continued)

*Primary Examiner* — Bharatkumar S Shah
(74) *Attorney, Agent, or Firm* — Morgan, Lewis & Bockius LLP; Manita Rawat (57) ABSTRACT

A system for generating a response to a customer query includes a computing device configured to obtain a first dataset, including a plurality of first phrase-intent pairs associated with a first domain. Each first phrase-intent pair includes a first phrase and a corresponding first intent. The computing device is configured to retrieve a set of configuration rules to configure a plurality of environments. The computing device is also configured to configure a first environment using the first dataset and the set of configuration rules to determine a result user intent based on a requested query associated with the first domain. The first environment embeds the plurality of first phrase-intent pairs in a vector space based on the set of configuration rules. The computing device is configured to perform operations based on the first environment.

17 Claims, 6 Drawing Sheets

(58) Field of Classification Search
USPC .......................................................... 704/232
See application file for complete search history.

(56) References Cited

U.S. PATENT DOCUMENTS

| | | | |
|---|---|---|---|
| 10,867,132 B2 | 12/2020 | Yan et al. | |
| 2015/0317302 A1* | 11/2015 | Liu ......................... | G06F 40/40 704/9 |
| 2020/0293874 A1* | 9/2020 | Ji ............................ | G06N 5/04 |

OTHER PUBLICATIONS

Colaboratory Tutorial, "Classification on DeepPavlov", Colab research, Google, Found at: <https://colab.research.google.com/github/deepmipt/DeepPavlov/blob/master/examples/classification_tutorialipynb#scrollTo=sKNbkR_JdYQc&printMo%E2%80%A6>, printed and accessed Jan. 13, 2021, 9 pages.

* cited by examiner

METHODS AND APPARATUS FOR INTENT RECOGNITION

TECHNICAL FIELD

The disclosure relates generally to methods and apparatuses for training intent recognition models. More particularly, the disclosure relates to methods and apparatuses for training models for different domains in the context of conversational interactions in ecommerce marketplaces.

BACKGROUND

Many ecommerce marketplaces allow users to interact with the marketplace using voice commands. Such voice commands can be made using various computing devices such as smart phones, voice assistants, tablets, laptops, desktop computers, kiosks, telephones, and other personal computing devices. The voice commands can allow users to shop on the ecommerce marketplace using a conversational interaction with a computing device. Interactions with existing systems that use existing methods and existing apparatuses can be cumbersome and resource intensive. Some retailers often operate in multiple domains (e.g., business verticals) that each allow for voice commands for interacting with the corresponding domains. Current systems utilize machine learning models (e.g., natural language understanding models) to understand a user's intent conveyed in a user query in order to generate a response in the context of conversational interactions.

However, as different domain may have different needs, existing systems often require training of a separate model for each domain in order to verbally interact with users in different domains. For example, Walmart® voice shopping may need to understand different commands (e.g., queries) than Google® Chat. Existing systems train separate models to serve the different domains. Existing systems often repeat the entire lengthy process of determining the right type of model, generating separate set of rules to train the model, generating corresponding separate training data, train the model, etc. Such repeated use of the entire process of training different models for different domains can be time consuming, and require a large amount of computing resources and storage space. As a result, the operator of the ecommerce marketplace can experience increased costs, time and computing space. There exists a need, therefore, for improved methods and apparatuses that can train conversational models in a faster, more efficient, and computationally less expensive manner that are more suitable for conversational interaction systems.

SUMMARY

The embodiments described herein are directed to methods and apparatuses for training machine learning models based on a set of rules for use in conversational interaction systems for ecommerce marketplaces. A common set of configuration rules may be used to configure multiple conversational environments (e.g., machine learning models) corresponding to different domains (e.g., business verticals, retail systems) to determine domain-specific user intents. The common set of configurations rules may be a singular architecture used to generate or training multiple models based on their corresponding sets of training data. In some examples, the set of configuration rules may define rules for data processing, data embedding, model generation, and model deployment. Training data from a domain may be used to train a domain-specific intent recognition model based on the configuration rules. Another domain-specific intent recognition model may similarly be generated based on the configuration rules using training data specific to the another domain. In this way, multiple models for multiple domains may be easily generated or trained using the same model generation pipeline without requiring individual development steps required by existing systems. The methods and apparatuses of the present disclosure deliver improved or equal results to existing systems that require significantly more resources or are more costly to implement.

In accordance with various embodiments, exemplary systems may be implemented in any suitable hardware or hardware and software, such as in any suitable computing device. For example, in some embodiments, a computing device is configured to obtain a first dataset associated with a first domain. The first dataset includes a plurality of first phrase-intent pairs, where each of the first phrase-intent pair includes a first phrase and a corresponding first intent. The computing device is further configured to retrieve a set of configuration rules to configure a plurality of environments. Each environment is configured to determine a plurality of user intents based on a plurality of user queries associated with the corresponding domain. Also, the computing device is configured to configure a first environment using the first dataset and the set of configuration rules to determine a result user intent based on a requested query associated with the first domain. The first environment embeds the plurality of first phrase-intent pairs based on the set of configuration rules. Further, the computing device is also configured to perform at least one operation based at least in part on the first environment.

In other embodiments of the present disclosure, a method for generating a first environment based on configurations rules in a conversational interaction context is provided. In one embodiment, a method can include obtaining a first dataset associated with a first domain, the first dataset includes a plurality of first phrase-intent pairs. Each of the first phrase-intent pair includes a first phrase and a corresponding first intent. The method also includes retrieving a set of configuration rules to configure a plurality of environments. Each environment is configured to determine a plurality of user intents based on a plurality of user queries associated with the corresponding domain. Further, the method includes configuring a first environment using the first dataset and the set of configuration rules to determine a result user intent based on a requested query associated with the first domain. The first environment embeds the plurality of first phrase-intent pairs based on the set of configuration rules. Also, the method includes performing at least one operation based at least in part on the first environment.

In other embodiments in accordance with the present disclosure, a non-transitory computer readable medium is provided. In some embodiments, the non-transitory computer readable medium can have instructions stored thereon, wherein the instructions, when executed by at least one processor, can cause a device to perform operations that include obtaining a first dataset associated with a first domain. The first dataset includes a plurality of first phrase-intent pairs, where each of the first phrase-intent pair includes a first phrase and a corresponding first intent; The operations include retrieving a set of configuration rules to configure a plurality of environments. Each environment is configured to determine a plurality of user intents based on a plurality of user queries associated with the corresponding domain. Further, the operations include configuring a first environment using the first dataset and the set of configuration rules to determine a result user intent based on a requested query associated with the first domain. The first environment embeds the plurality of first phrase-intent pairs based on the set of configuration rules. The operations also include performing at least one operation based at least in part on the first environment.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "connected," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

The use of voice assistants on home computing device and on personal computing devices such as smart phones, tablets, laptops and the like has become more commonplace and has found increasing acceptance and use by consumers. This, in turn, has increased the usage of conversational interactions and transactions on ecommerce marketplaces. Users of such ecommerce marketplaces have increasing sought to perform transactions and other actions (e.g., chat, ask questions) on ecommerce marketplaces using voice commands. The ecommerce marketplaces can often have a tool that can facilitate the use of voice commands to execute interactions and transactions on the ecommerce marketplace. Conversational shopping or other conversational interactions can have problems that can lead to decreased customer satisfaction or can lead to customer frustration. When customers are dissatisfied with the conversational interactions with the ecommerce marketplace, this can lead to decreased transactions, decreased revenues, increased costs because a customer may choose other more costly methods of executing the transaction and can lead to customers dropping from the website, mobile application or other service. In order to train automated chat bots to interact with customers of various business verticals (e.g., retail systems, domains), a large amount of time and resources needs to be spend on training different bots for different domains from start to finish in order to meet different requirements corresponding to different domains.

The methods and apparatuses of the present disclosure can be used to improve a training pathway for efficiently training various machine learning models to assist with conversational interactions on ecommerce marketplaces. One problem with existing conversational tools on ecommerce marketplaces is they often repeat the entire lengthy process of determining the right type of model, generating separate set of rules to train the model, generating corresponding separate training data, train the model, etc. Such repeated use of the entire process of training different models for different domains can be time consuming, and require a large amount of computing resources and storage space. As a result, the operator of the ecommerce marketplace can experience increased costs, time and computing space. There exists a need, therefore, for improved methods and apparatuses that can train conversational models in a faster, more efficient, and computationally less expensive manner that are more suitable for conversational interaction systems.

Figure 1:
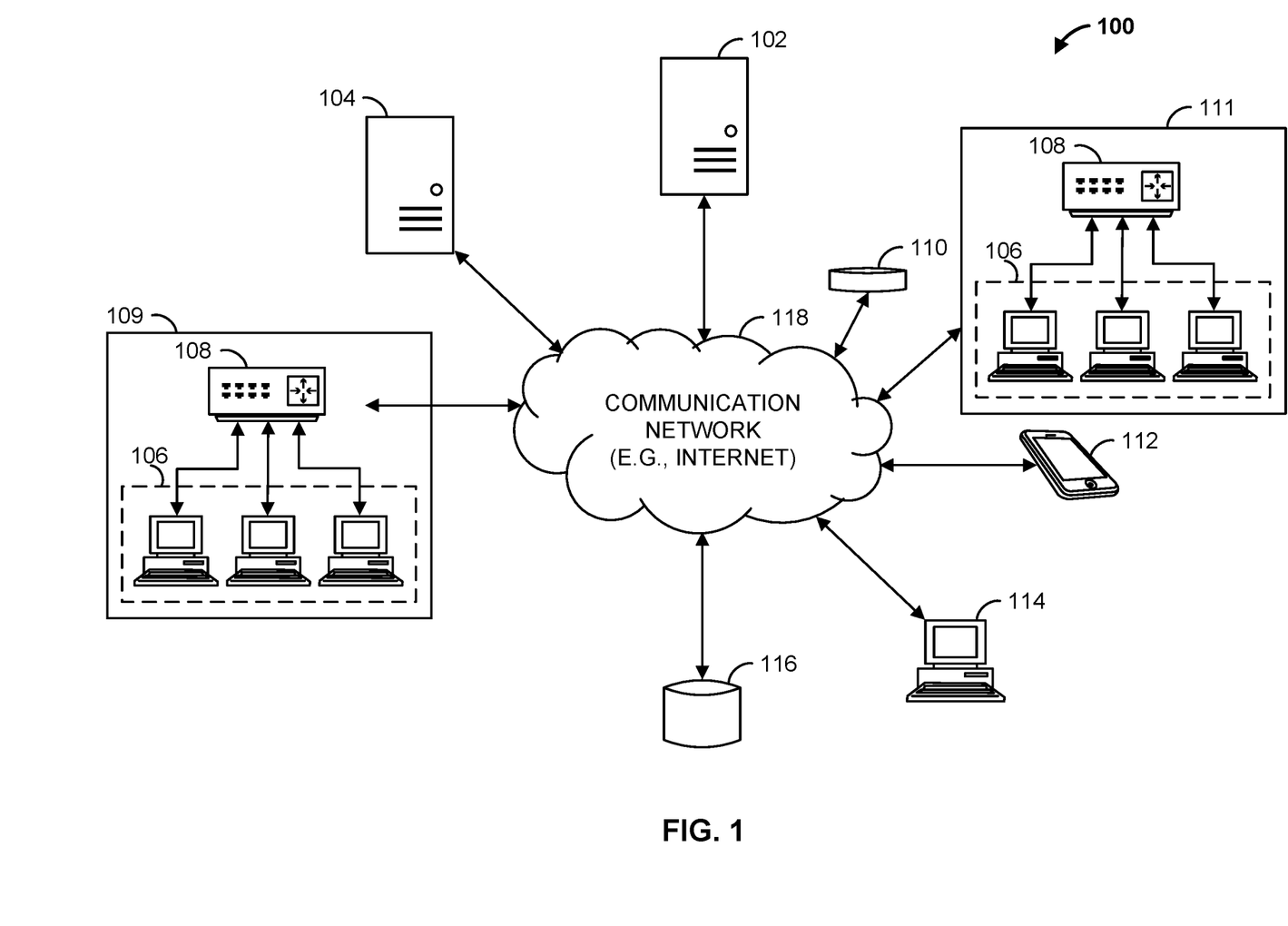
FIG. 1 is a block diagram of a training system in accordance with some embodiments.

Turning to the drawings, FIG. 1 illustrates a block diagram of a training system 100 that includes a conversational interaction computing device 102 (e.g., a server, such as an application server), a web server 104, workstation(s) 106, database 116, and multiple customer computing devices 110, 112, 114 operatively coupled over network 118. conversational interaction computing device 102, workstation(s) 106, server 104, and multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 118.

In some examples, conversational interaction computing device 102 can be a computer, a workstation, a laptop, a server such as a cloud-based server, or any other suitable device. In some examples, each of multiple customer computing devices 110, 112, 114 can be a cellular phone, a smart phone, a tablet, a personal assistant device, a voice assistant device, a digital assistant, a laptop, a computer, or any other suitable device. In some examples, conversational interaction computing device 102 is operated by one or more entities training one or more machine learning models for one or more business verticals (e.g., ecommerce marketplaces, chat applications, domains, retail systems), and multiple customer computing devices 112, 114 are operated by customers of the entities.

Although FIG. 1 illustrates three customer computing devices 110, 112, 114, training system 100 can include any number of customer computing devices 110, 112, 114. Similarly, training system 100 can include any number of workstation(s) 106, conversational interaction computing devices 102, servers 104, and databases 116.

Workstation(s) 106 are operably coupled to communication network 118 via router (or switch) 108. Workstation(s) 106 and/or router 108 may be located at a store 109, for example. Workstation(s) 106 can communicate with conversational interaction computing device 102 over communication network 118. The workstation(s) 106 may send data to, and receive data from, conversational interaction computing device 102. For example, the workstation(s) 106 may transmit data related to user interactions (e.g., questions, queries) to conversational interaction computing device 102. In response, conversational interaction computing device 102 may transmit an indication of one or more machine learning model results to the workstation(s) 106 in real-time.

In some examples, web server 104 may host one or more web pages, such as a retailer's or merchant's website. Web server 104 may transmit data related to user interactions and/or transactions on the website by a customer or user to conversational interaction computing device 102. In response, conversational interaction computing device 102 may use features of the training data to train a machine learning model corresponding to the domain holding or operating the website. For example, the web server 104 may send user interaction data (e.g., questions, queries) from one webpage to the conversational interaction computing device 102 which may extract features related to intent recognition and use it to train the machine learning model to output intent predictions on real-time interactions related to another web page. Conversational interaction computing device 102 may perform an overlap analysis on data (e.g., query, question) received from the web server 104 and features used to train the machine learning model for that webpage. The data samples provided by the web server 104 for training a conversational machine learning model may be used to train a model based on a pre-determined set of configuration rules. Data samples provided by the web server 104 for training another conversational machine learning model may be used to train another model based on the pre-determined set of configuration rules.

First customer computing device 110, second customer computing device 112, and Nth customer computing device 114 may communicate with web server 104 over communication network 118. For example, each of multiple computing devices 110, 112, 114 may be operable to view, access, and interact with webpages of a website hosted by web server 104. In some examples, web server 104 hosts a website for a retailer or merchant that allows for the purchase of items. For example, the website may list prices for advertised items. An operator of one of multiple computing devices 110, 112, 114 may access the website hosted by web server 104, add one or more items to an online shopping cart of the website, and perform an online checkout of the shopping cart to purchase the items for the listed prices. An operator of one of multiple computing devices 110, 112, 114 may access the website hosted by web server 104, access a chat bot and send a query to the conversational interaction computing device 102.

Conversational interaction computing device 102 is operable to communicate with database 116 over communication network 118. For example, conversational interaction computing device 102 can store data to, and read data from, database 116. Database 116 can be a remote storage device, such as a cloud-based server, a memory device on another application server, a networked computer, or any other suitable remote storage. Although shown remote to conversational interaction computing device 102, in some examples, database 116 can be a local storage device, such as a hard drive, a non-volatile memory, or a USB stick.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

Conversational interaction computing device 102 can use a set of rules to train multiple domain-specific machine learning models associated with multiple domains using corresponding multiple domain-specific training data. For example, conversational interaction computing device 102 may obtain a first training dataset associated with a first domain and a second training dataset associated with a second domain from database 116. The first training dataset may be related to a specific domain, such as a chat application, and the second dataset may be related to another domain, such as an ecommerce transaction application. Conversational interaction computing device 102 may further obtain a pre-determined set of configuration rules from database 116. The set of configuration rules may include rules and/or steps to train conversational machine learning models to detect user intent based on a conversational user query (e.g., question). Database 116 may include training data for a plurality of domains (e.g., business verticals, applications, websites). Each training dataset may include a plurality of training intents associated with a plurality of training phrases. Each training intent may be paired with one or more training phrases. Conversational interaction computing device 102 may receive the first and second training datasets prior to generating machine learning models to predict user intentions for their corresponding domains. Conversational interaction computing device 102 may receive the pre-determined set of configurations rules prior to training the machine learning models. In some examples, the configuration rules may be received in response to receiving new or updated first and/or second datasets.

Configuration rules may include a pre-determined training pipeline including multiple stages for training machine learning models for intent recognition (e.g., user intent). For examples, intent recognition may include user's intents such as adding an item to a cart, agent discussion intent, card checking intent, etc., indicating a user's intent based on user interactions with a website or application. The configuration rules may, for example, include stages including data processing rules, data embedding rules, and training rules. Training datasets for each domain may undergo each stage of the configuration rules to train the corresponding machine learning models for intent recognition in their corresponding domains. Instead of performing individual development steps required by existing systems to determine configuration rules for individual domains, conversational interaction computing device 102 allows for easy, quick training of models based on pre-determined rules. In this way, conversational interaction computing device 102 may easily train machine learning models for every new dataset without requiring manual intervention in the process, and without requiring a large amount of computing resources and processing power. Further, conversational interaction computing device 102 provides domain-specific solution and privacy for intent detection in a shorter period of time than existing systems, allowing for quicker revisions and real-time deployment.

Conversational interaction computing device 102 may then train the machine learning models (e.g., first machine learning model, second machine learning model) associated with the domain (e.g., first domain, second domain) using the data samples (e.g., first training dataset, second training dataset) and the pre-determined set of configuration rules to predict user intents in real-time. The trained machine learning model(s) may be deployed in the corresponding domain to accurately and efficiently predict user intents in real-time as new data (e.g., user query, user interaction, user question) is received from or at the domain. The output(s) of the trained machine learning model may then be used by conversational interaction computing device 102 to perform operations, such as but not limited to, provide query results (e.g., answers, reaction to the query) in real-time or near real-time.

Data Processing Rules

In some examples, conversational interaction computing device 102 may apply a plurality of data processing rules to the received training dataset (e.g., first training dataset, second training dataset). Training dataset includes a plurality of training intents, each training intent associated or paired with one or more training phrases. In some examples, conversational interaction computing device 102 may analyze the training phrases to divide them into one of natural language sentence and a regular expression format. The training phrases in the regular expression format may be matched to template phrases in database 116. In some examples, the training phrases in regular expression format may be filtered out and the natural language sentences in the training phrases may be further processed. Configuration rules may include a normalizing step where the training phrases are applied to a normalizer to filter our non-ASCII characters. In some examples, the normalizer may filter in allowed alphabets and special characters (e.g., question mark, period). In some examples, the normalizer may further replace slang words in the training phrases with word expansions or contractions.

Data processing rules may also include an imbalance correction stage. During imbalance correction stage, conversational interaction computing device 102 may compute a class-wise weight for each of the training phrases. The weights may be based on a number of training phrases corresponding to a label or class. The classes (e.g., labels) with a lower number of training phrases than a predetermined amount, may be augmented to correct for class imbalance. The class imbalance may be corrected using paraphrasing and duplication techniques to increase the number of training phrases for the classes. Rule-based logic may be used to increase the number of training phrases in the classes with a low number of original training phrases.

In some examples, the training phrases (e.g., processed/augmented training phrases) may further undergo additional processing stages, such as but not limited to, case handling, numeric character conversions, etc. to normalize the training phrases. The processed training dataset may then be embedded in a vector space based on data embedding rules.

Data Embedding Rules

In some examples, data embedding rules may be used by conversational interaction computing device 102 to embed the training dataset prior to model generation. For example, the processed training dataset may be embedded in a vector space. In some examples, a vectorization technique may be used to embed the processed training phrases. The vectorization technique may project the entire vocabulary of words constituting the training dataset as relatable to each other in a vector space. The relationships between the words may allow for making the training dataset consumable for classification, even with a small amount of training data. In some examples, a term frequency-inverse document frequency vectorization ("Tf-IDF") technique may be used to generate the vector embeddings. In such examples, the words in the training phrases may be tokenized individually and their TF-IDF vector may be computer. The Tf-IDF embeddings of the training dataset may be computed as following:

$$tf-idf(t,d) = tf(t,d) * idf(t) \qquad \text{eq. 1}$$

$$idf(t) = \log\left[\frac{n}{df(t)}\right] + 1 \qquad \text{eq. 2}$$

$$tf = f(t,d) \qquad \text{eq. 3}$$

where t represents the term (e.g., word), d represents the domain (e.g., training dataset), f represents the frequency of the term in the domain. The embeddings may then be used to train a domain-specific machine learning model based on training rules.

Training Rules

Conversational interaction computing device 102 may apply training rules to the vector embeddings to train a machine learning model for the corresponding domain to determine user intents based on user interactions (e.g., queries, requests, questions, interactions) in real-time. The vector embeddings corresponding to the training dataset (e.g., first training dataset, second training dataset) may be used as input to train an intent recognition machine learning model (e.g., deep neural network, convolutional neural network, neural network) for the corresponding domain (e.g., first domain, second domain). In some examples, the machine learning model may be trained each time a user updates the training dataset and initiates training pipeline. The machine learning model may be a light weight model (e.g., uses smaller computational space, storage) that may be trained quickly (e.g., a few seconds) using a small size of training dataset.

In some examples, conversational interaction computing device 102 may use a clustering technique for classifying the vector embeddings. For example, a support vector classification model for multi-class classification with RBF kernel may be implemented in scikit-learn as the machine learning model to classify the embeddings. The vector embeddings may be used as input to the support vector classification model to train the model.

The machine learning model may then use the clusters to predict user intents in real-time based on user interactions with the corresponding domain. Each training dataset for each corresponding domain may similarly be trained using the data processing rules, data embedding rules, and the training rules. The machine learning model(s) may then be deployed on corresponding domain(s) to accurately and efficiently predict user intents in real-time as new data (e.g., user query, user interaction, user question) is received from or at the domain(s). The output(s) of the trained machine learning model may then be used by conversational interaction computing device 102 to perform operations, such as but not limited to, provide query results (e.g., answers, reaction to the query, perform actions) in real-time or near real-time.

Figure 2:
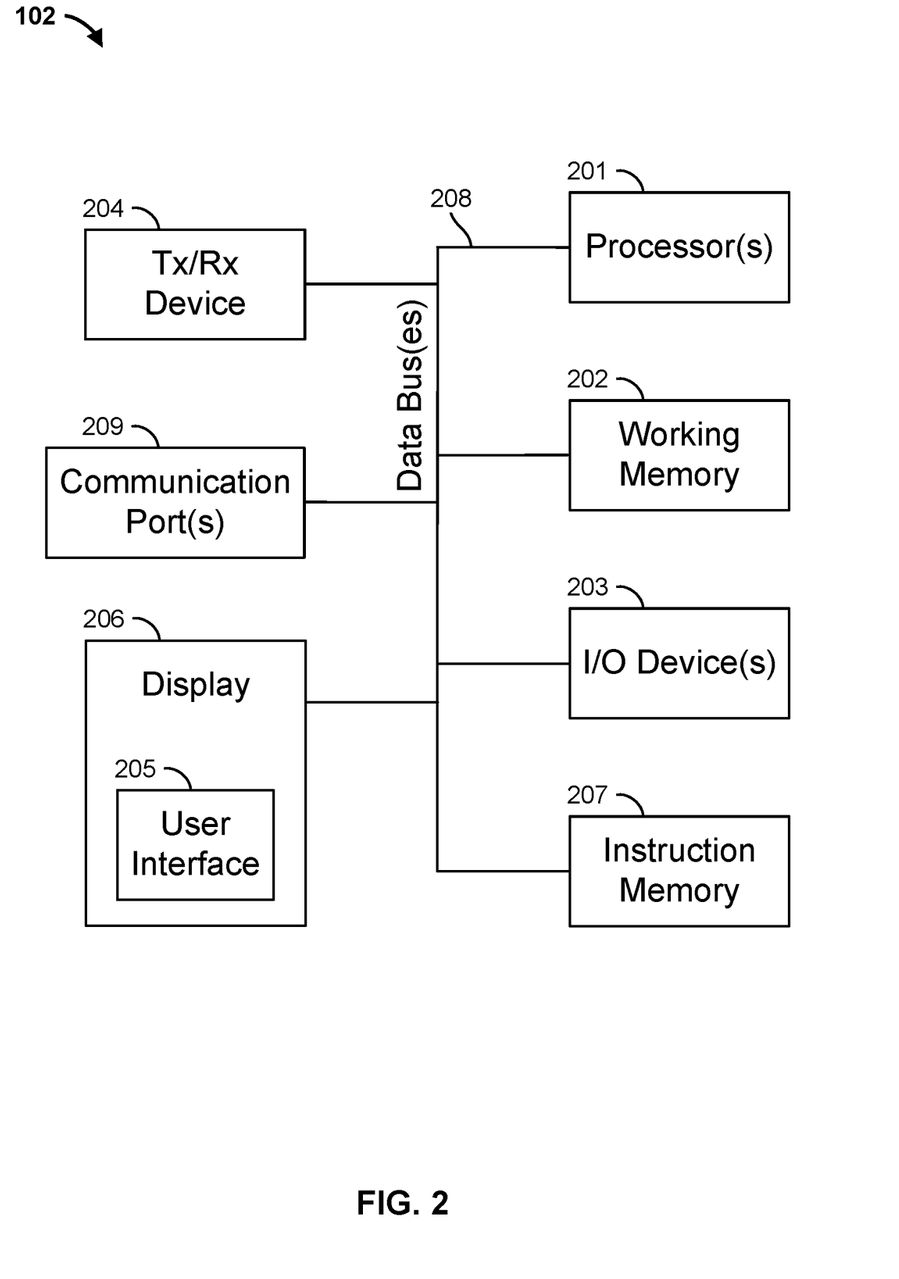
FIG. 2 is a block diagram of a conversational interaction computing device of training system of FIG. 1 in accordance with some embodiments.

Referring now to FIG. 2, FIG. 2 illustrates conversational interaction computing device 102 of FIG. 1. Conversational interaction computing device 102 can include one or more processors 201, working memory 202, one or more input/output devices 203, instruction memory 207, a transceiver 204, one or more communication ports 209, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of the conversational interaction computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as machine learning algorithm training data.

Display 206 can display user interface 205. User interfaces 205 can enable user interaction with the conversational interaction computing device 102. For example, user interface 205 can be a user interface for an application of a retailer that allows a customer to view and interact with a retailer's webpage. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 and conversational interaction computing device 102 will be operating in. Processor(s) 201 is operable to receive data from, or send data to, a network, such as communication network 118 of FIG. 1, via transceiver 204.

Figure 3:
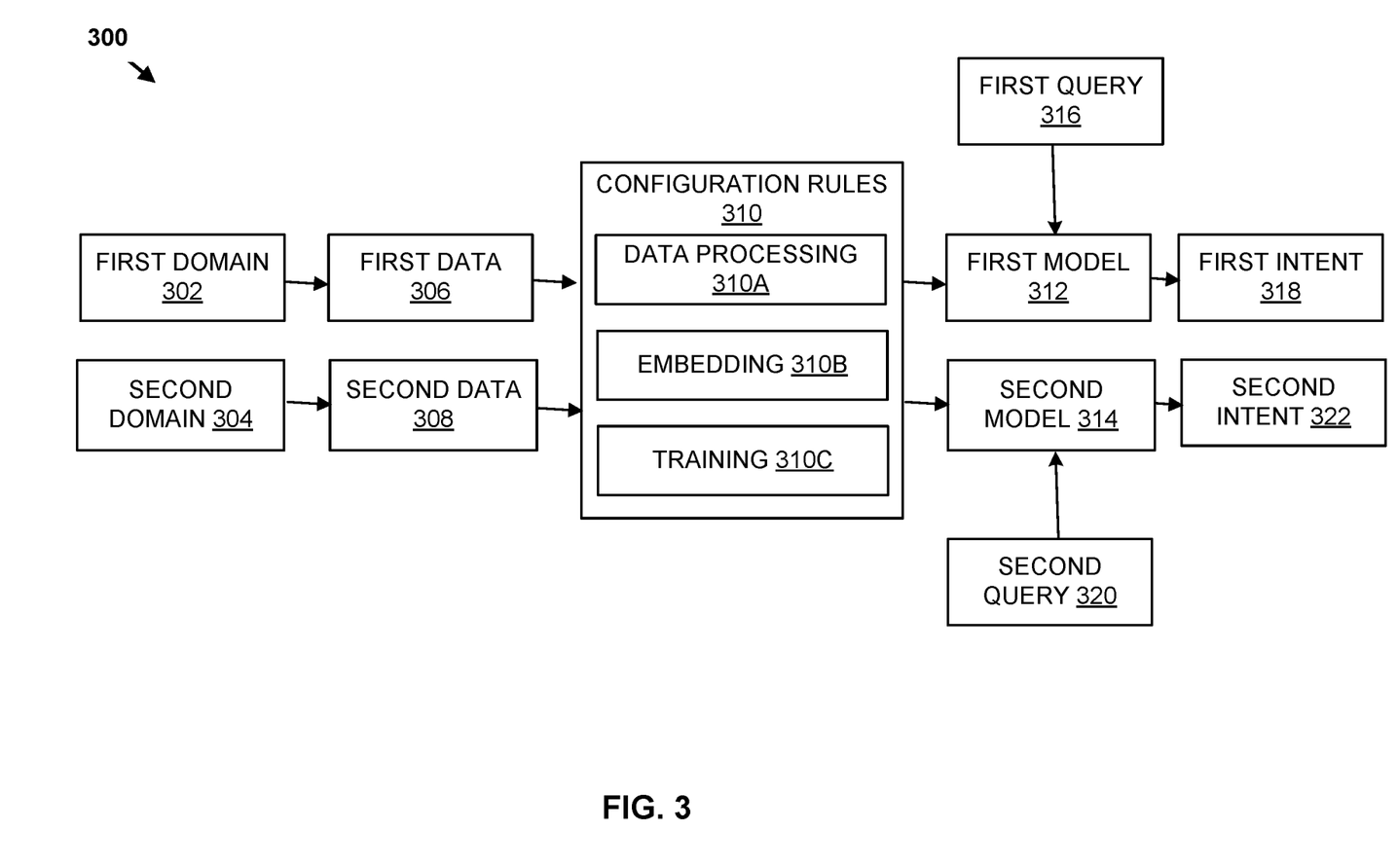
FIG. 3 is an example process flow illustrating a process of training a plurality of machine learning models using the training system of FIG. 1 in accordance with some embodiments.

FIG. 3 is an example process flow illustrating a process 300 of training a plurality of machine learning models using the training system of FIG. 1 in accordance with some embodiments. The process flow 300 illustrates how the training system 100 can leverage a single set of configuration rules to train multiple natural language models in an efficient and quick manner. First data 306 and second data 308 may be obtained corresponding to the first domain 302 and the second domain 304, respectively. For example, the first data 306 may include first training intent-phrase pairs corresponding to first domain 302 to train a first model 312. Similarly, second data 308 may include second training intent-phrase pairs corresponding to second domain 304 to train a second model 312.

Configuration rules 310 may be used to train and/or generate the first model 312 and the second model 314. Configuration rules 310 may include rules for data processing 310A, embedding 310B and training 310C. Configuration rules 310 may be applied to the first data 306 to generate first clusters and/or classifications to train the first model 312. Similarly, configuration rules 310 may be applied to second data 308 to generate second clusters and/or classifications to train the second model 314.

Specifically, data processing 310A rules may be applied to first data 306 to generate first processed training data (e.g., processed training phrases). A variety of normalization and imbalance correction techniques may be used to process the training data. Next, the first processed training data may be embedded into a vector space using embedding 310B rules. The embedded vectors then may be used to train the first model 312 using training 310C rules. Clusters may be generated based on the embeddings to classify the words in the vocabulary of the first data 306. The embeddings and/or the classifications may then be used to train the first model 312 as input.

Similarly, data processing 310A rules may be applied to second data 308 to generate second processed training data (e.g., processed training phrases). A variety of normalization and imbalance correction techniques may be used to process the training data. Next, the second processed training data may be embedded into a vector space using embedding 310B rules. The embedded vectors then may be used to train the second model 314 using training 310C rules. Clusters may be generated based on the embeddings to classify the words in the vocabulary of the second data 308. The embeddings and/or the classifications may then be used to train the second model 314 as input.

Once the first model 312 and/or the second model 314 are trained, the process 300 then applies a first query 316 to the first model 314 and/or a second query 320 to the second model 314. The first query 316 and the second query 320 may be received at the conversational interaction computing device 102 via the first domain 302 and the second domain 304, respectively, in real-time. In response to receiving first query 316 at the first model 312, first model 312 may output first intent 318 based on the first query 316. The first intent 318 may be a user intent predicted based on user interactions with first domain 302. Conversational interaction computing device 102 may use the output of the first model 312 to generate a response to the first query 316. For example, if the predicted first intent 318 is "Add Item to Cart," the computing device may add the item to the cart.

In response to receiving second query 320 at the second model 314, second model 314 may output second intent 322 based on the second query 312. The second intent 322 may be a user intent predicted based on user interactions with second domain 304. Conversational interaction computing device 102 may use the output of the second model 314 to generate a response to the second query 320. For example, if the predicted second intent 322 is "Quote," the computing device may provide a quote to the user.

As can be appreciated, the process 300 is a simplified illustration of the processing that occurs to arrive at the first model 312 and second model 314. In other examples, the process 300 can include other steps or other sub-processes in addition to, or in other sequences, from the one illustrated. As can also be appreciated, the process 300 or the elements thereof can be repeated multiple times during a single interaction between a user and a personal agent, network-enabled tool, retailer's website or online store.

Figure 4:
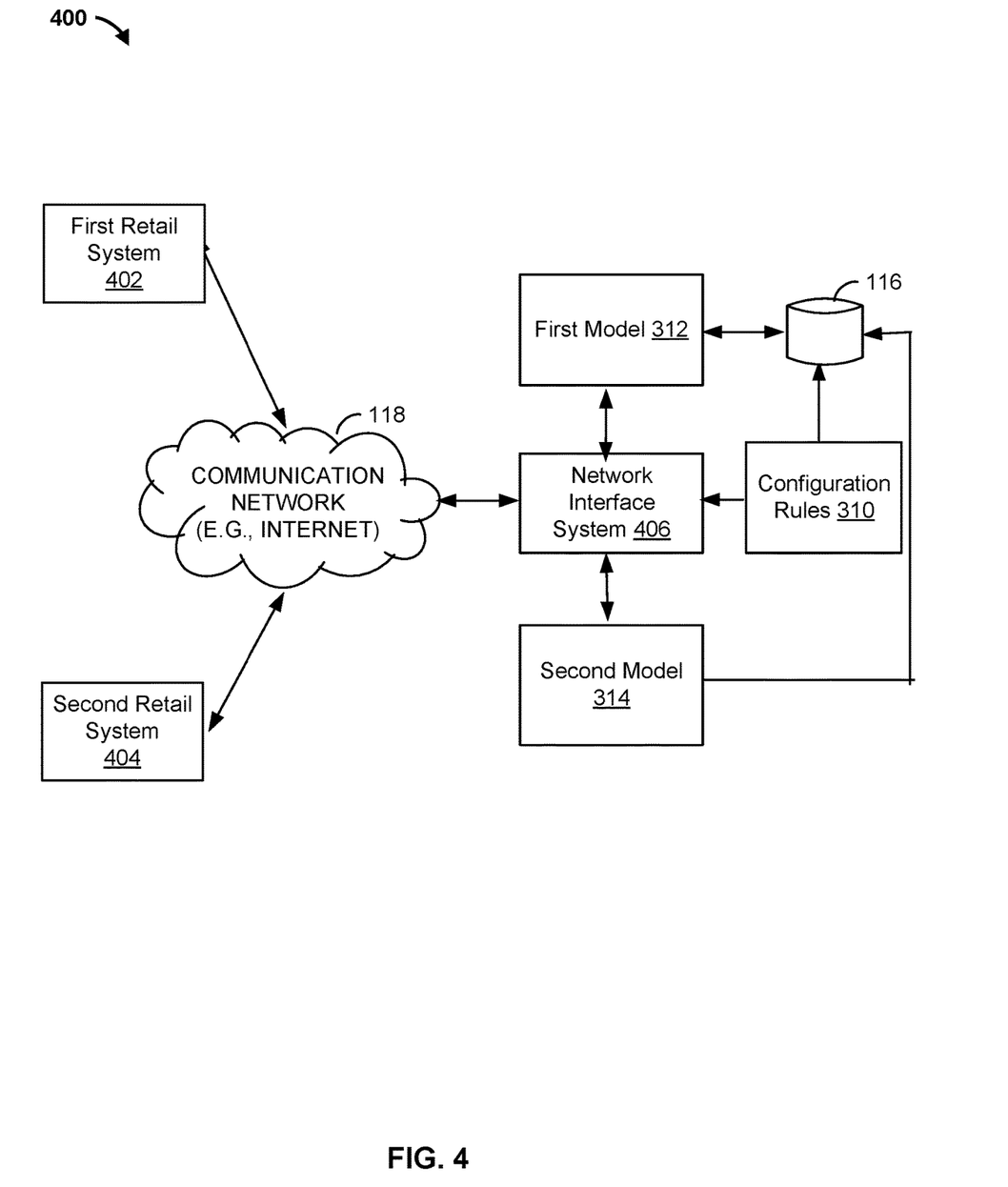
FIG. 4 illustrates a networked environment configured to provide a unified training data generation platform of training system of FIG. 1 in accordance with some embodiments.

Turning to FIG. 4, FIG. 4 illustrates a networked environment 400 configured to provide a unified training data generation platform, in accordance with some embodiments. The networked environment 400 may include, but is not limited to, one or more first retail systems 402, a second retail system 404, at least one network interface system 406, at least one first model 312 and at least one second model 314. Each of the retail systems 402 and 404, network interface system 406, first model 312, and/or the second model 314 may include a system as described above with respect to FIG. 1. Although embodiments are illustrated having a discrete systems, it will be appreciated that one or more of the illustrated systems may be combined into a single system configured to implement the functionality and/or services of each of the combined systems. For example, although embodiments are illustrated and discussed herein including each of a network interface system 406, a first model 312, and a second model 314, it will be appreciated that these systems may be combined into a single logical and/or physical system configured to perform the functions and/or provide services associated with each of the individual systems.

In some embodiments, a network environment or platform may be provided to the first retail system 402, and second retail system 404 by the network interface system 406. The network platform may include separate network interfaces for each of the first retail system 402 and second retail system 404, such as, for example, an interface accessible through one or more browsers, applications, or other interfaces. For example, in some embodiments, the network platform is a collection of retail platforms. Each of the first retail system 402 and second retail system 404 may be associated with one or more domains of the network platform. For example, in embodiments including retail platforms, each of the first retail system 402 and second retail system 404 may be associated with a separate retail platform or domain that offers goods and/or services for sale through the retailer interfaces.

In some embodiments, network 118 may obtain first training data from first retail system 402. The first training data related to the first retail system 402 may include a plurality of first user intents, each first user intent associated with at least one first training phrase. The first training data may include data corresponding to needs of the first retail system 402, including, such as but not limited to, potential questions, potential actions, potential items for sale, their corresponding prices, etc. The first retail system 402 may provide to the network interface system 406 the first training data via the network 118.

Similarly, in some embodiments network 118 may obtain second training data from second retail system 404. The second training data related to the second retail system 404 may include a plurality of second user intents, each second user intent associated with at least one second training phrase. The second training data may include data corresponding to needs of the second retail system 404, including, such as but not limited to, potential questions, potential actions, potential items for sale, their corresponding price and sizes, etc. The second retail system 404 may provide to the network interface system 406 the first training data via the network 118.

Network interface system 406 may obtain configuration rules 310 to configure and/or train first model 312 and second model 314 based on the first training data and second training data received from first retail system 402 and second retail system 404, respectively. Configuration rules 310 may be received from database 116 and may include a set of rules to follow to train the intent recognition models for multiple domains. As described able, the configuration rules 310 may include data processing 310A rules, embedding 310B rules, and/or training 310C rules. Each machine learning model for corresponding each domain (e.g. retail system) may be trained using the same configuration rules 310. Configuration rules 310 may be a set of steps to be used to train intent recognition models.

Network interface system 406 may generate and/or train the first model 312 and the second model 314 based on corresponding first training data and second training data, respectively, and using the configuration rules 310. First model 312 and second model 314 may each be train to detect user intents from user interactions associated with the corresponding first retail system 402 and second retail system 404, respectively. First training data and second training data may each undergo similar data processing, data embedding, and training pipeline in order to train the first model 312 and the second model 314, as described above with respect to FIG. 1. The trained first model 312 and second model 314 may be used to predict user intents in new data received from the first retail system 402 and second retail system 404, respectively (e.g., inference data for interactions made using the retail system).

The trained first model 402 and trained second model 404 may be then be provided to the network interface system 406 to use to generate outputs based on new data received by the first retail system 402 and second retail system 404, respectively, in real-time or near-real time. In some examples, the network interface system 406 may update and/or regenerate the first model 312 and/or second model 314 as new training data is received from the first retail system 402 and second retail system 404, respectively.

Although embodiments are discussed herein including a retail platforms, it will be appreciated that the systems and methods disclosed herein are applicable to any system and/or environment that allows third-party participants to act in traditional "first-party" roles. Example environments include, but are not limited to, e-commerce platforms, service environments (e.g., technical assistance, medical assistance, etc.), software-as-a-service environments, server environments, digital environments, and/or any other suitable environment or system.

Figure 5:
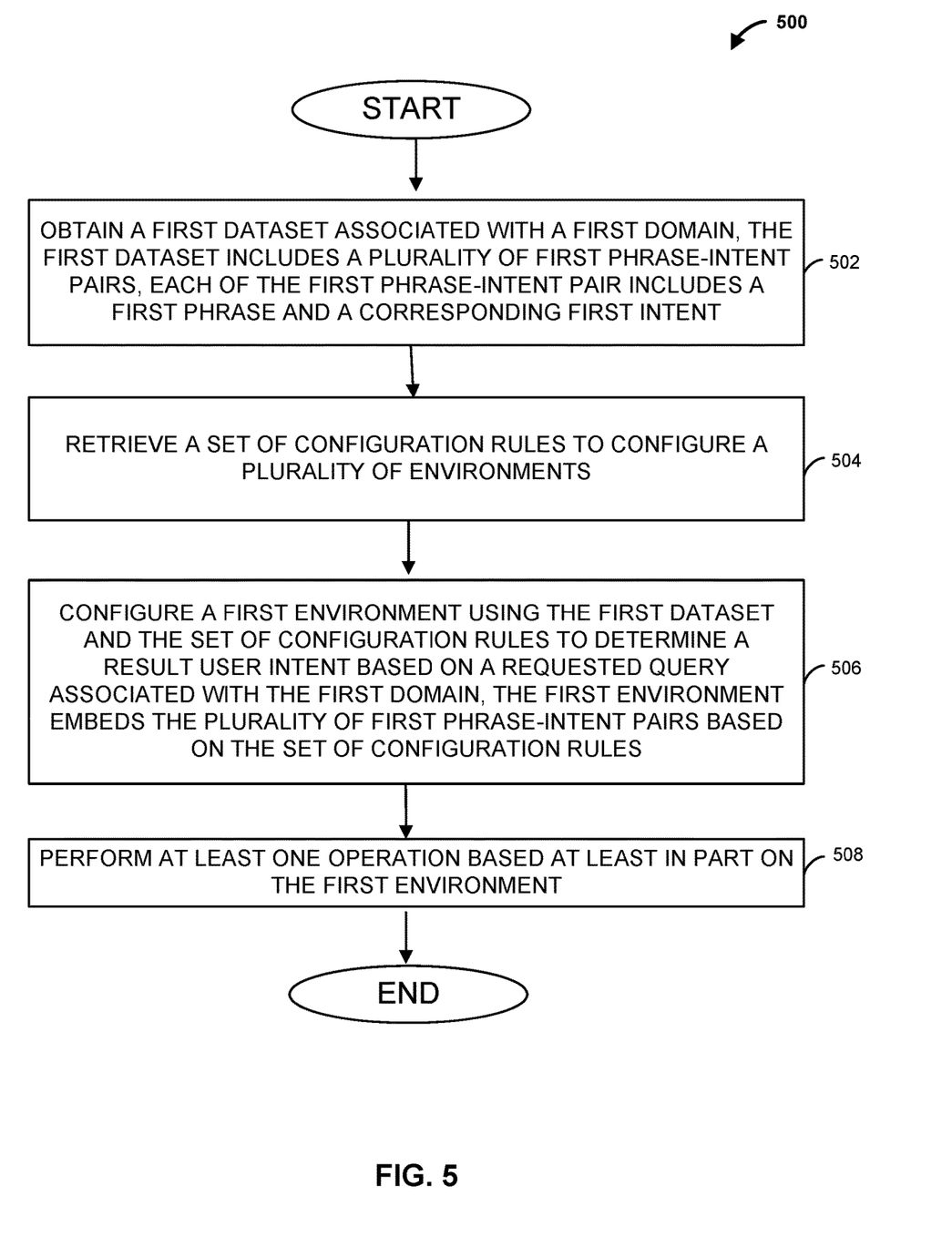
FIG. 5 is a flowchart of an example method that can be carried out by the training system of FIG. 1 in accordance with some embodiments.

FIG. 5 is a flowchart of an example 500 that can be carried out by the conversational interaction system 100 of FIG. 1. Beginning at step 502, obtain a first dataset associated with a first domain, the first dataset includes a plurality of first phrase-intent pairs, each of the first phrase-intent pair includes a first phrase and a corresponding first intent. For example, conversational interaction computing device 102 may receive a first dataset (first data 306) associated with first domain 302 from web server 104. First data 306 include first phrase-intent pairs, where each of the phrase intent pair includes a first phrase and a corresponding first intent.

At step 504, a set of configuration rules to configure a plurality of environments is retrieved. Each environment is configured to determine a plurality of user intents based on a plurality of user queries associated with the corresponding domain. For example, configuration rules 310 are obtained from database 117. The configurations rules 310 may include rules to configure environments (e.g.,) first model 312, second model 314) to determine user intents (e.g., first intent 318, second intent 322) based on user queries (e.g., first query 316, second query 320).

At step 506, a first environment is configured using the first dataset and the set of configuration rules to determine a result user intent based on a requested query associated with the first domain. The first environment embeds the plurality of first phrase-intent pairs based on the set of configuration rules. For example, first model 312 is configured using first data 306 and configuration rules 310 to determine a result user intent (e.g., first intent 318) based on a requested query (e.g., first query 316). The first model 312 embeds plurality of first phrase-intents included in first data 302 based on configuration rules 310.

At step 508, at least one operation is performed based at least in part on the first environment. For example, conversational interaction computing device 102 may perform operations based at least in part on the first model 312. The method then ends.

Figure 6:
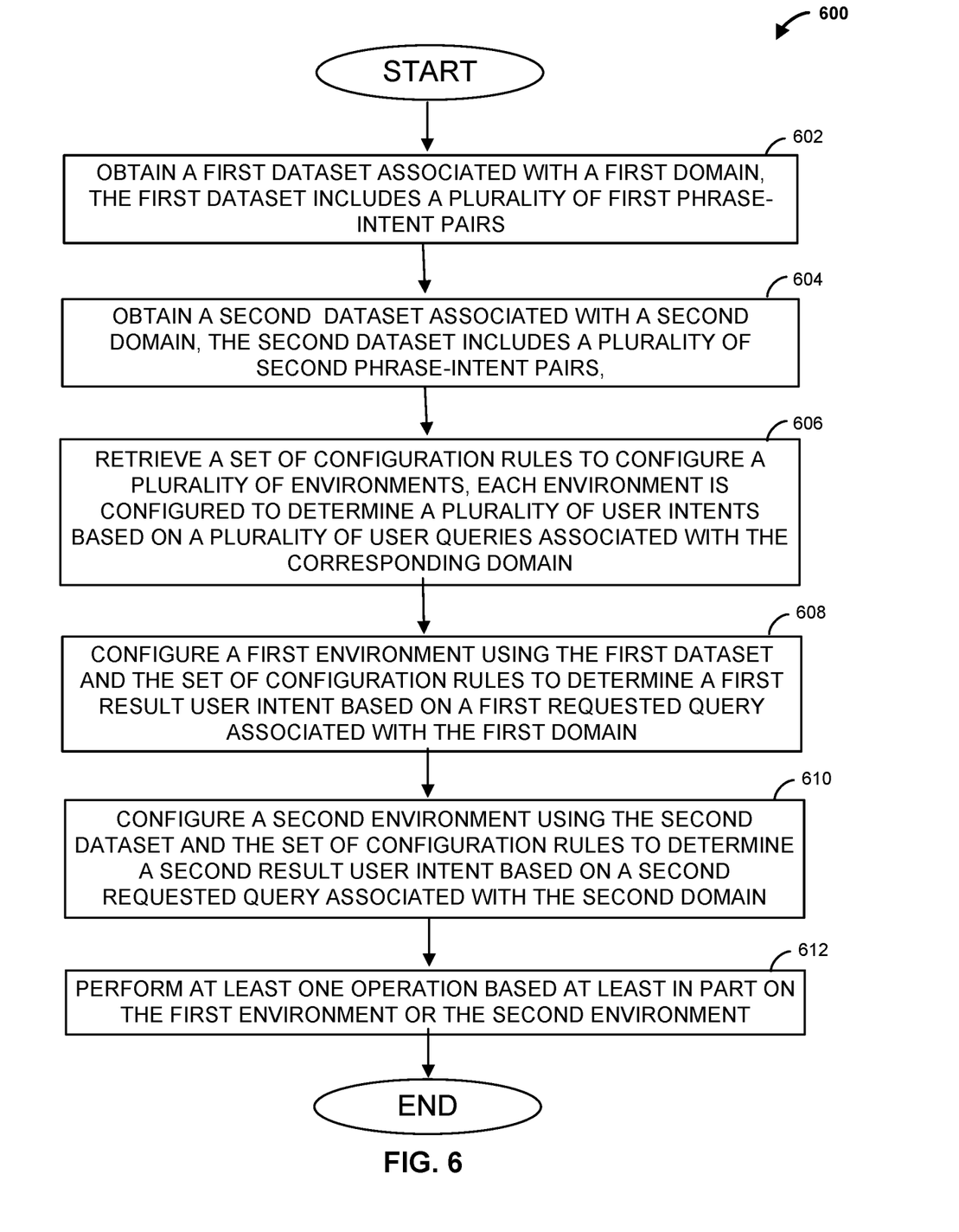
FIG. 6 is a flowchart of another example method that can be carried out by the training system of FIG. 1 in accordance with some embodiments

FIG. 6 illustrates another example method 600 of the present disclosure. Example method 600 illustrates another method of training multiple machine learning models by leveraging a set of configuration rules. The method begins at step 602, when the training system 100 obtains a first dataset associated with a first domain. The first dataset includes a plurality of first phrase-intent pairs. For example, conversational interaction computing device 102 may receive a first dataset (first data 306) associated with first domain 302 from web server 104. First data 306 include first phrase-intent pairs, where each of the first phrase-intent pair includes a first phrase and a corresponding first intent.

The method at step 604, includes obtaining a second dataset associated with a second domain. The second dataset includes a plurality of second phrase-intent pairs. For example, conversational interaction computing device 102 may receive a second dataset (second data 308) associated with second domain 304 from web server 104. Second data 308 include second phrase-intent pairs, where each of the second phrase-intent pair includes a second phrase and a corresponding second intent.

At step 606, a set of configuration rules to configure a plurality of environments is retrieved. Each environment is configured to determine a plurality of user intents based on a plurality of user queries associated with the corresponding domain. For example, configuration rules 310 are obtained from database 117. The configurations rules 310 may include rules to configure environments (e.g.,) first model 312, second model 314) to determine user intents (e.g., first intent 318, second intent 322) based on user queries (e.g., first query 316, second query 320).

At step 608, a first environment is configured using the first dataset and the set of configuration rules to determine a first result user intent based on a first requested query associated with the first domain. For example, first model 312 is configured using first data 306 and configuration rules 310 to determine a result user intent (e.g., first intent 318) based on a requested query (e.g., first query 316).

At step 610, a second environment is configured using the second dataset and the set of configuration rules to determine a second result user intent based on a second requested query associated with the second domain. For example, second model 314 is configured using second data 308 and configuration rules 310 to determine a result user intent (e.g., second intent 322) based on a requested query (e.g., second query 320).

At step 612, at least one operation is performed based at least in part on the first environment or the second environment. For example, conversational interaction computing device 102 may perform operations based at least in part on the first model 312 and/or the second model 314. The method then ends.

While not shown in FIGS. 5 and 6, the conversational interaction computing device 102 can continuously update and/or regenerate the training data and the machine learning models as the machine learning models continuously learn due to the increased data that is available to the machine learning model once the machine learning model is actively used to generate predictions on data received from the corresponding domains or retail systems. As such, training process may be continuously used to update the machine learning models.

The foregoing examples focused on descriptions of the principles and teachings of the present disclosure used in the context of a retailer and an ecommerce marketplace. As can be appreciated, the methods and apparatuses described herein can be applied in various contexts and in various industries. The method and apparatuses of the present disclosure can be used to provide search results in other contexts, other industries and in other environments such as in the financial services, health services and other industries as well.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The term model as used in the present disclosure includes data models created using machine learning. Machine learning may involve training a model in a supervised or unsupervised setting. Machine learning can include models that may be trained to learn relationships between various groups of data. Machine learned models may be based on a set of algorithms that are designed to model abstractions in data by using a number of processing layers. The processing layers may be made up of non-linear transformations. The models may include, for example, artificial intelligence, neural networks, deep convolutional and recurrent neural networks. Such neural networks may be made of up of levels of trainable filters, transformations, projections, hashing, pooling and regularization. The models may be used in large-scale relationship-recognition tasks. The models can be created by using various open-source and proprietary machine learning tools known to those of ordinary skill in the art.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
a computing device configured to:
obtain a first dataset associated with a first domain, wherein the first dataset includes a plurality of first phrase-intent pairs, wherein each first phrase-intent pair includes a first phrase and a corresponding first intent;
retrieve a first set of configuration rules to configure a plurality of environments;
configure a first environment using the first dataset and using the first set of configuration rules to determine a result user intent based on a requested query associated with the first domain, wherein the first environment embeds the plurality of first phrase-intent pairs in a vector space based on the first set of configuration rules;
obtain a second dataset associated with a second domain distinct from the first domain;
configure a second environment using the second dataset and using the first set of configuration rules to determine a second result user intent based on a second requested query associated with the second domain; and
perform at least one operation based at least in part on the first environment or the second environment.

2. The system of claim 1, wherein the first set of configuration rules include one or more of data processing rules, data embedding rules, and training rules.

3. The system of claim 1, wherein the second environment embeds a plurality of second phrase-intent pairs in a second vector space based on the first set of configuration rules.

4. The system of claim 1, wherein the first set of configuration rules includes a plurality of steps to perform in response to receiving a training dataset.

5. The system of claim 1, wherein the first environment is an intent recognition model.

6. The system of claim 1, wherein the computing device is further configured to:
receive the requested query via the first domain;
apply the requested query to the first environment to determine the result intent; and
provide for presentation, via a user interface, the result user intent.

7. A method comprising:
obtaining a first dataset associated with a first domain, wherein the first dataset includes a plurality of first phrase-intent pairs, wherein each first phrase-intent pair includes a first phrase and a corresponding first intent;
retrieving a first set of configuration rules to configure a plurality of environments;
configuring a first environment using the first dataset and using the first set of configuration rules to determine a result user intent based on a requested query associated with the first domain, wherein the first environment embeds the plurality of first phrase-intent pairs in a vector space based on the first set of configuration rules;
obtaining a second dataset associated with a second domain distinct from the first domain;
configuring a second environment using the second dataset and using the first set of configuration rules to determine a second result user intent based on a second requested query associated with the second domain; and
performing at least one operation based at least in part on the first environment or the second environment.

8. The method of claim 7, wherein the first set of configuration rules include one or more of data processing rules, data embedding rules, and training rules.

9. The method of claim 7, wherein the second environment embeds a plurality of second phrase-intent pairs in a second vector space based on the first set of configuration rules.

10. The method of claim 7, wherein the first set of configuration rules includes a plurality of steps to perform in response to receiving a training dataset.

11. The method of claim 7, wherein the first environment is an intent recognition model.

12. The method of claim 7, the method further comprising:
receiving the requested query via the first domain;
applying the requested query to the first environment to determine the result intent; and
providing for presentation, via a user interface, the result user intent.

13. A non-transitory computer readable medium having instructions stored thereon, wherein the instructions, when executed by at least one processor, cause a device to perform operations comprising:
obtaining a first dataset associated with a first domain, wherein the first dataset includes a plurality of first phrase-intent pairs, wherein each first phrase-intent pair includes a first phrase and a corresponding first intent;
retrieving a first set of configuration rules to configure a plurality of environments;
configuring a first environment using the first dataset and using the first set of configuration rules to determine a result user intent based on a requested query associated with the first domain, wherein the first environment embeds the plurality of first phrase-intent pairs in a vector space based on the first set of configuration rules;

obtaining a second dataset associated with a second domain distinct from the first domain;

configuring a second environment using the second dataset and using the first set of configuration rules to determine a second result user intent based on a second requested query associated with the second domain; and performing at least one operation based at least in part on the first environment or the second environment.

14. The non-transitory computer readable medium of claim 13, wherein the first set of configuration rules include one or more of data processing rules, data embedding rules, and training rules.

15. The non-transitory computer readable medium of claim 13, wherein the second environment embeds a plurality of second phrase-intent pairs in a second vector space based on the first set of configuration rules.

16. The non-transitory computer readable medium of claim 13, wherein the first set of configuration rules includes a plurality of steps to perform in response to receiving a training dataset.

17. The non-transitory computer readable medium of claim 13, wherein the first environment is an intent recognition model.

* * * * *